(12) United States Patent
Sawada et al.

(10) Patent No.: US 7,093,979 B2
(45) Date of Patent: Aug. 22, 2006

(54) AEROSTATIC BEARING

(75) Inventors: Kiyoshi Sawada, Sizuoka (JP); Kenzo Ebihara, Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 68 days.

(21) Appl. No.: 10/360,641

(22) Filed: Feb. 10, 2003

(65) Prior Publication Data

US 2003/0169950 A1 Sep. 11, 2003

(30) Foreign Application Priority Data

Mar. 8, 2002 (JP) .................................. 2002-063898

(51) Int. Cl.
*F16C 32/06* (2006.01)

(52) U.S. Cl. .................................................. 384/12

(58) Field of Classification Search ............ 74/12, 74/13, 42, 100
See application file for complete search history.

(56) References Cited

U.S. PATENT DOCUMENTS

| | | | | | |
|---|---|---|---|---|---|
| 4,354,686 | A | * | 10/1982 | Imanishi et al. ............ 277/431 |
| 4,426,118 | A | * | 1/1984 | Mohsin ..................... 384/12 |
| 4,702,041 | A | * | 10/1987 | Alder ....................... 451/5 |
| 4,704,712 | A | * | 11/1987 | Siryj ....................... 369/249 |
| 4,749,283 | A | * | 6/1988 | Yokomatsu et al. ......... 384/12 |
| 4,822,181 | A | * | 4/1989 | Egli ........................ 384/12 |
| 4,946,293 | A | * | 8/1990 | Helms ...................... 384/12 |
| 5,281,032 | A | * | 1/1994 | Slocum ..................... 384/118 |
| 5,407,280 | A | | 4/1995 | Heinzl et al. |
| 5,562,396 | A | * | 10/1996 | Yamazaki et al. ........... 414/676 |
| 5,692,838 | A | * | 12/1997 | Yoshimoto et al. ........... 384/12 |
| 5,971,614 | A | | 10/1999 | Kane et al. |
| 6,238,092 | B1 | * | 5/2001 | Carlson ..................... 384/12 |
| 2002/0054717 | A1 | * | 5/2002 | Zywno ...................... 384/12 |

FOREIGN PATENT DOCUMENTS

| | | |
|---|---|---|
| DE | 3627771 | 6/1987 |
| DE | 36 27 771 A1 | 6/1987 |
| EP | 0 182 703 A1 | 5/1986 |
| JP | 60-162732 | 10/1985 |
| JP | 2000-195807 | 7/2000 |
| JP | 2002-57102 | 2/2002 |

OTHER PUBLICATIONS

International Search Report.
Japanese Office Action Issued on Mar. 2, 2005.

* cited by examiner

*Primary Examiner*—Thomas R. Hannon
(74) *Attorney, Agent, or Firm*—Staas & Halsey LLP

(57) ABSTRACT

A guide member and a slide are disposed such as to be opposed to each other through a bearing clearance therebetween. Air is supplied to the bearing clearance through a main pipe, a branch pipe and an orifice provided in the slide. Shape and size of each portions of the main pipe, the branch pipe and the orifice are determined such that Reynolds number becomes 2000 or less in any of the portions of the main pipe, the branch pipe and the orifice so that a turbulent flow is not generated in air flow approaching the bearing clearance.

11 Claims, 12 Drawing Sheets

AEROSTATIC BEARING

BACKGROUND OF THE INVENTION

1. Field of the Invention

The present invention relates to an improvement of an aerostatic bearing.

2. Description of the Prior Art

In an aerostatic bearing, a guide member and a movable member are disposed such as to be opposed to each other through a bearing clearance therebetween, and one of the guide member and movable member is formed with an air-supply passage so that air flow is supplied to the bearing clearance. This aerostatic bearing has a smaller moving error and higher precision as compared with a rolling bearing due to an air-averaging effect. Therefore, the aerostatic bearings are used in various apparatus and machines requiring high precision. However, as the precision required by machine tools and measuring devices becomes higher, working precision and measuring precision as small as 1 nanometer or less are required. Therefore, micro-vibration of the aerostatic bearing, which has not been an issue until now, becomes hindrance for enhancing the precision.

The micro-vibration of the aerostatic bearing is generated when air flow is perturbed to cause a turbulent flow state. Vibration caused by the turbulent flow is vibration of 10 to several tens of kHz having no natural frequency. For this reason, resonance frequency of a machine can not be out of a band of frequency of this micro-vibration. Therefore, although amplitude of actual vibration is 1 nanometer or less, depending on the configuration of a machine, the micro-vibration may produce resonance, and the vibration may increase to several tens of nanometer. In a conventional aerostatic bearing, such micro-vibration is not negligible, and this is a problem for machines or apparatus requiring working precision and measuring precision of 1 nanometer or less as described above.

To realize a highly precise aerostatic bearing, it is necessary to eliminate a turbulent flow of air flowing through a pipe in the bearing, or to eliminate influence of vibration caused by the turbulent flow. If an air-supply pressure is merely lowered, the flow velocity becomes small, and the turbulent flow in the pipe can be eliminated. However, since the rigidity of aerostatic bearing is proportional to pressure, the aerostatic bearing can not be used under low pressure.

OBJECTS AND SUMMARY OF THE INVENTION

It is an object of the present invention to provide an aerostatic bearing which generates vibration very little.

A flow of fluid has two states, i.e., a laminar flow and a turbulent flow. If the flow of air flowing through an air passage of an aerostatic bearing becomes turbulent flow, vibration described above is generated. Therefore, if the air flow can be laminar flow, it is possible to avoid the generation of vibration. The two states of the fluid flow can be distinguished by a numerical value of Reynolds number Re. The Reynolds number Re is defined as follows:

$$Re = \rho u L / \mu$$

wherein $\rho$ represents density, u represents velocity, L represents length (diameter of the pipe), and $\mu$ represents viscosity coefficient.

Since a transition zone between the laminar flow and the turbulent flow lies in Re=2000 to 3000, if the Reynolds number Re is 2000 or less, the air flow is laminar flow. Since the air flow is completely smooth in the laminar flow state, vibration is not generated in the air flow. In the conventional aerostatic bearing, diameters and the number of pipes are determined to such minimum values that air flowing therein does not generate great pressure loss. In the present invention, however, air is allowed to flow in the laminar flow in all passages of air flowing through the aerostatic bearing.

If a fact that the density $\rho$ of air depends on air pressure is taken into consideration, it can be said that the Reynolds number Re is proportional to the air pressure, the flow velocity and diameter of the pipe. Air pressure which can be supplied to the aerostatic bearing is determined in a using site of itself. Thereupon, according to the present invention, size and shape of an air-supply passage and a bearing clearance are constituted such that air flow becomes laminar flow in the air-supply passage and the bearing clearance, based on the applied air supply pressure, so that the laminar flow (having, for example, Reynolds number Re=2000 or less) is established over the entire path of the air flow, thereby preventing vibration from generating.

Further, the air-supply passage comprises a main pipe, a branch pipe connected to the main pipe and an orifice connected to the branch pipe and the bearing clearance, and the laminar flow is formed in each of such portions. To this end, the main pipe is provided with a plurality of air flow inlets which supply air to the main pipe, a plurality of main pipes are provided and the main pipes are connected to each other through the branch pipe, and a cross-sectional area of the air passage of the main pipe, susceptible to turbulent flow, is set larger than a cross-sectional area of the air passage of the branch pipe, thereby forming the laminar flow in each of the portions. Bent portions of the main pipe and the branch pipe are constituted in a curved line, or the orifice connected to each branch pipe comprises two or more holes. The bearing clearance is set to 6 μm or less, thereby securing the flow of the laminar flow. This aerostatic bearing is applied to a machine tool or a measuring device.

According to the present invention, air flow is formed into the laminar flow in the air passage and the bearing clearance to eliminate the vibration generating factor. Therefore, it is possible to realize a stable aerostatic bearing having precision of 1 nanometer or less.

DETAILED DESCRIPTION OF THE PREFERRED EMBODIMENTS

Figure 1:
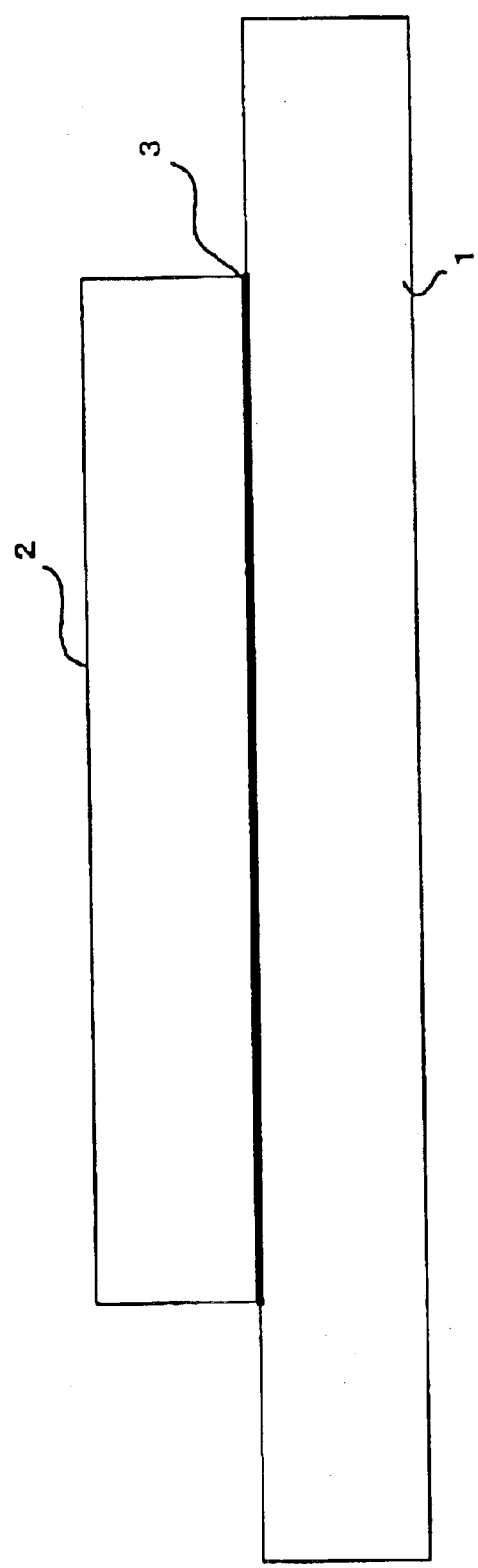
FIG. 1 is an explanatory view of a linearly moving mechanism using an aerostatic bearing.

FIG. 1 is an explanatory view of a linearly moving mechanism to which an aerostatic bearing of the present invention is applied. A slide 2 which is a movable member is supported in a floating manner by a guide member 1 which is a stationary portion such as to be opposed to each other through a bearing clearance 3 which forms an air layer of several μm.

Figure 2:
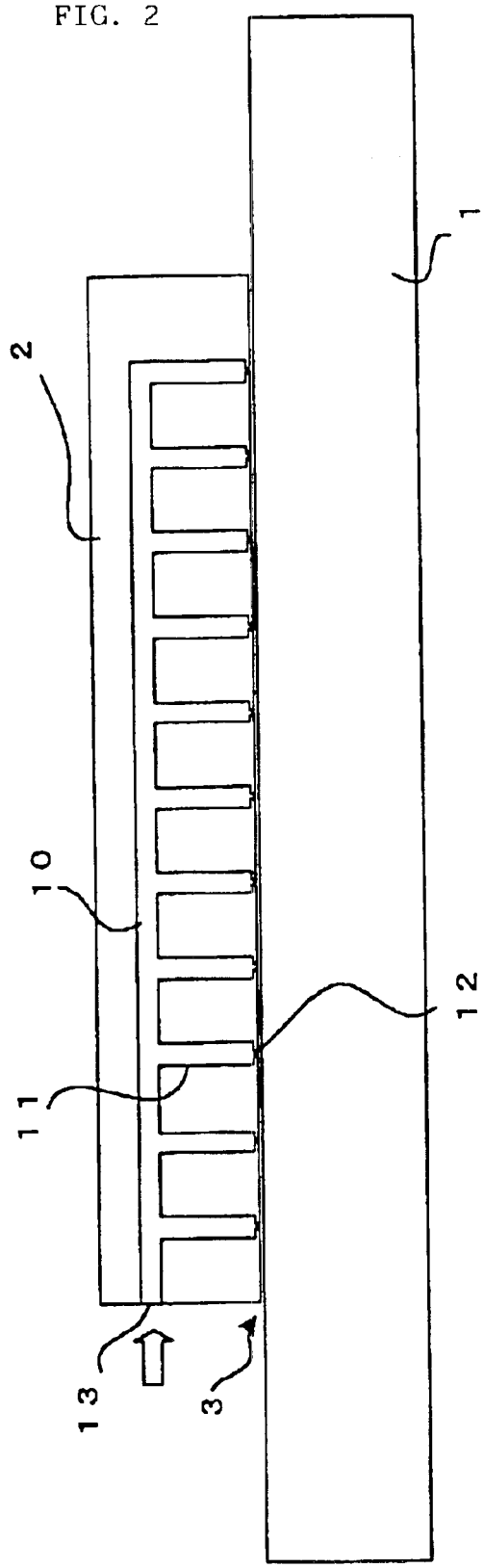
FIG. 2 is a sectional view of the linearly moving mechanism shown in FIG. 1.

FIG. 2 is a sectional view for explaining a linearly moving mechanism shown in FIG. 1. Air pipes forming an air passage are formed like the teeth of a comb in the slide 2. This air passage comprises a main pipe 10, a plurality of branch pipes 11, 11, . . . connected to the main pipe 10, and orifices 12 each provided on a tip end of the branch pipe 11 to connect the respective branch pipe 11 and the bearing clearance 3 provided between the guide member 1 and the slide 2. The main pipe 10, the branch pipes 11, 11, . . . , the orifices 12 and the bearing clearance 3 constitute the aerostatic bearing. Although the air pipes are provided on the side of the slide in the example shown in FIG. 2, the air pipes may be provided on the side of the guide member 1 alternatively.

Air introduced from an air flow inlet 13 of the main pipe 10 passes through the main pipe 10, and is introduced into the branch pipes 11, 11, . . . , and the air is supplied from the orifice 12 provided on the tip end of the branch pipe 11 into an aerostatic bearing surface, i.e., the bearing clearance 3. A state in which the slide 2 floats from the guide member 1 is held by the air pressure supplied to the bearing clearance 3.

Figure 3:
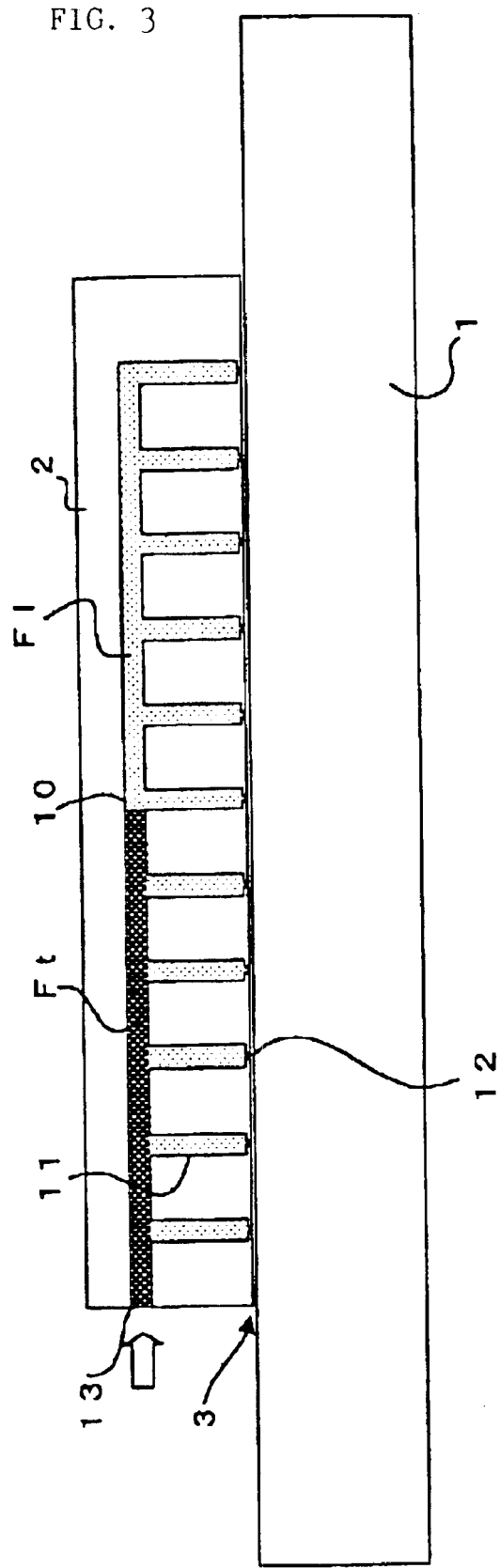
FIG. 3 is an explanatory view of an air flow in the aerostatic bearing having the linearly moving mechanism shown in FIG. 2.

FIG. 3 is an explanatory view of the air flow of the aerostatic bearing in a conventional linearly moving mechanism of a type shown in FIG. 2. Air from the air flow inlet 13 passes through the main pipe 10, respective branch pipe 11 and orifice 12 and is supplied to the bearing clearance 3. As the air supplied from the air flow inlet 13 is branched from the main pipe 10 into the branch pipes 11, 11, . . . , the flow velocity of the air gradually becomes slow little by little. As described above, whether the air flow becomes the laminar flow or turbulent flow is determined by the Reynolds number Re, and the Reynolds number Re is proportional to the flow velocity.

Therefore, the flow velocity of air is fast in an area of the main pipe 10 closer to the air flow inlet 13 and the flow becomes a turbulent flow Ft, and the flow becomes a laminar flow Fl in an end area of the main pipe 10 further from the air flow inlet 13. Although a transition zone exists between the turbulent flow and the laminar flow, only the two states, i.e., only the turbulent flow Ft and the laminar flow Fl are shown in FIG. 3 for simplification. A flow rate in the branch pipe 11 corresponds to a flowrate of one orifice 12, the flow velocity is lowered and thus, the flow becomes the laminar flow Fl.

As described above, the turbulent flow Ft is generated in the vicinity of the air flow inlet 13 of the main pipe 10, and this becomes a cause of generation of vibration. To avoid this, there is a method in which the air pressure is lowered to lower the Reynolds number Re in order that the laminar flow Fl is formed in all the regions of the main pipe 10. However, this method is not preferable because the rigidity of the aerostatic bearing is proportional to the air pressure and thus, the rigidity of the bearing is undesirably lowered.

Thereupon, according to the present invention, the rigidity of the aerostatic bearing is not lowered, and the air passage and the bearing clearance of the aerostatic bearing are formed such that the air flow in all the regions of the air-supply passage becomes laminar flow.

Figure 4:
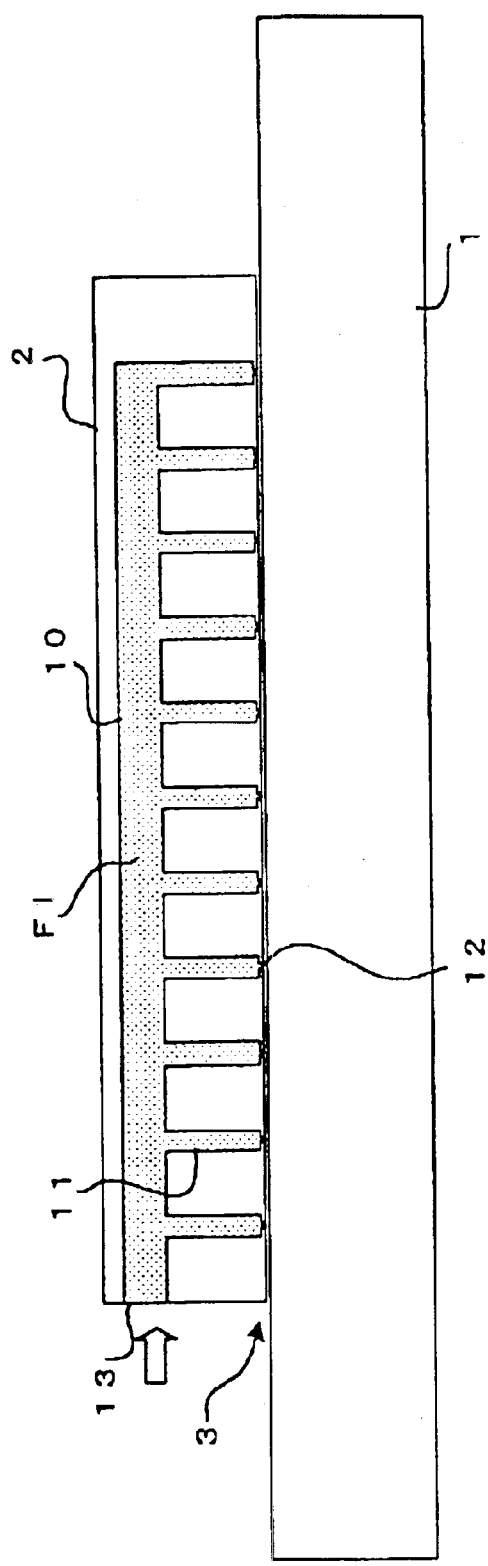
FIG. 4 is an explanatory view of the linearly moving mechanism using an aerostatic bearing according to a first embodiment of the present invention.

FIG. 4 is an explanatory view of one embodiment of the aerostatic bearing of the present invention. A diameter of the main pipe 10 is increased to prevent the turbulent flow Ft in the main pipe 10 from generating. It is possible to find whether the air flow becomes laminar flow or turbulent flow by obtaining the Reynolds number Re as described above. Further, the air pressure which can be supplied to the aerostatic bearing in a site where the aerostatic bearing is used is determined. For this reason, since the density ρ in the Reynolds number (Re=ρuL/μ) is determined by the air pressure, the density is constant. As a result, the Reynolds number Re is proportional to the velocity u and the diameter L of the pipe.

Thereupon, if the diameter of the main pipe 10 is set to two times (2L), the flow velocity becomes ¼ (u/4) in proportion to a cross-sectional area of the main pipe 10. As a result, the diameter of the pipe×flow velocity becomes ½ (2L·(u/4)=L·u/2), the Reynolds number Re becomes ½, and the laminar flow can be obtained. For this reason, in the embodiment of the invention shown in FIG. 4, the diameter of the main pipe is determined such that the Reynolds number Re becomes 2000 or less based on the air pressure from a compressed air source to be used.

Figure 5:
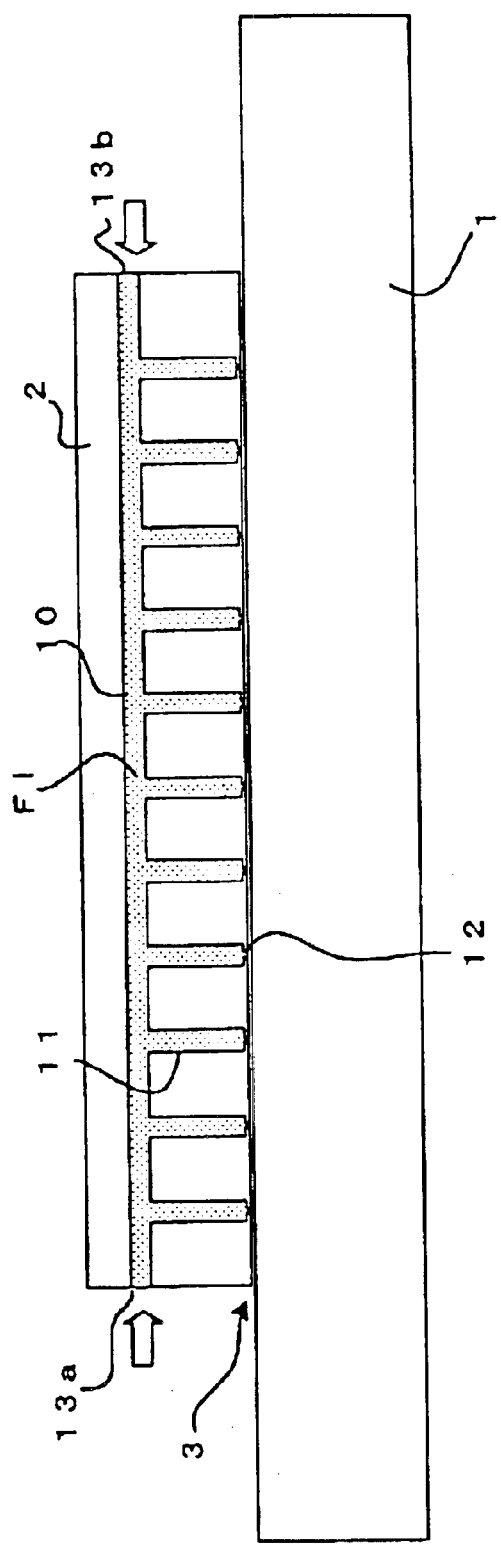
FIG. 5 is an explanatory view of the linearly moving mechanism using an aerostatic bearing according to a second embodiment of the present invention.

FIG. 5 is an explanatory view of another embodiment for preventing the turbulent flow from generating in the main pipe 10. The number of air flow inlet 13 which is an inlet of air introduced into the main pipe 10 is increased. In the example shown in FIG. 5, the number of air flow inlets (13a and 13b) is increased two times as compared with the conventional example shown in FIG. 2. Air introduced into the main pipe 10 is discharged out through the plurality of branch pipes 11, 11, . . . and orifices 12. If the number of inlets of air introduced into the main pipe 10 is increased, the flow velocity in the vicinity of the air flow inlet 13 of the main pipe 10 is reduced correspondingly. Since the number of air flow inlets is two time in the example shown in FIG. 5 as compared with the example shown in FIG. 2, the flow velocity of air in the vicinity of each of the air flow inlets 13a and 13b in the embodiment shown in FIG. 5 is ½ as compared with the embodiment shown in FIG. 2. As a result, the Reynolds number Re is lowered as small as ½ and the flow becomes laminar flow, and it is possible to prevent the turbulent flow from generating.

Figure 6:
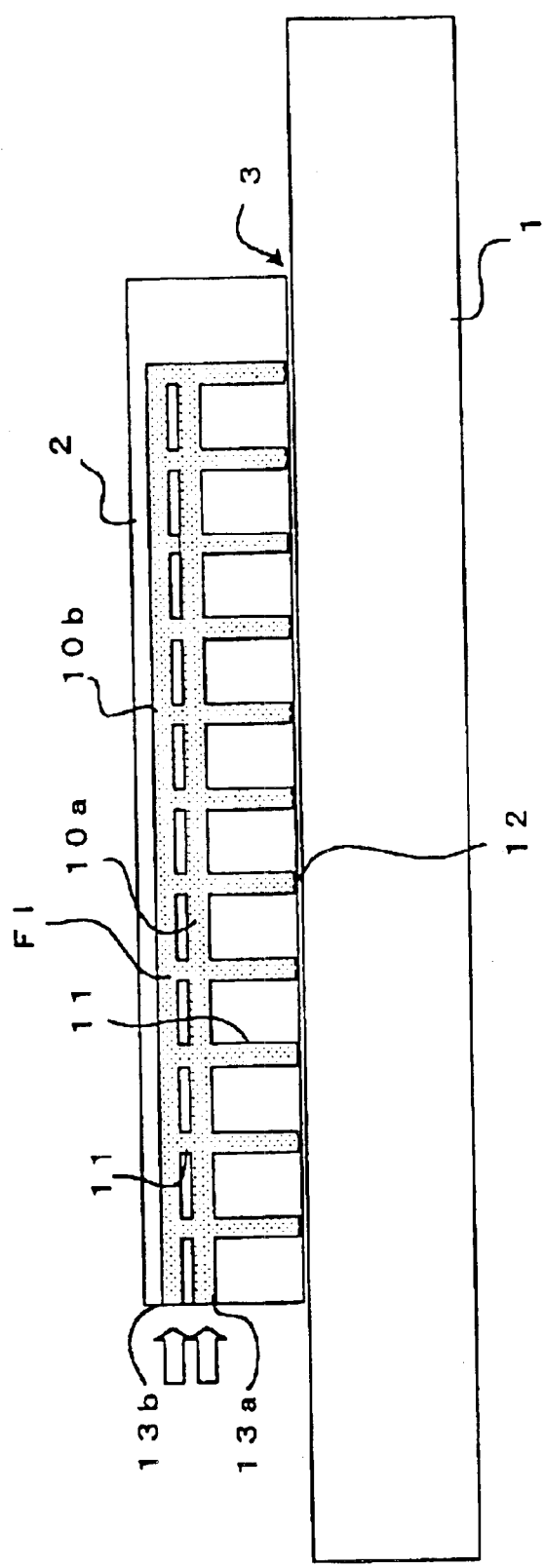
FIG. 6 is an explanatory view of the linearly moving mechanism using an aerostatic bearing according to a third embodiment of the present invention.

FIG. 6 is an explanatory view of another embodiment of the present invention for preventing the turbulent flow from generating in the main pipe 10 in another method. In this embodiment, the number of main pipes 10 is increased. In the example shown in FIG. 6, the number of the main pipes (10a and 10b) is increased two times, and the main pipes 10a and 10b are connected to each other through the branch pipes 11, 11, . . . In this example also, the Reynolds number Re can be reduced by the same reason as the case where the diameter of the pipe of the main pipe is increased or where the number of air flow inlets is increased.

Figure 7:
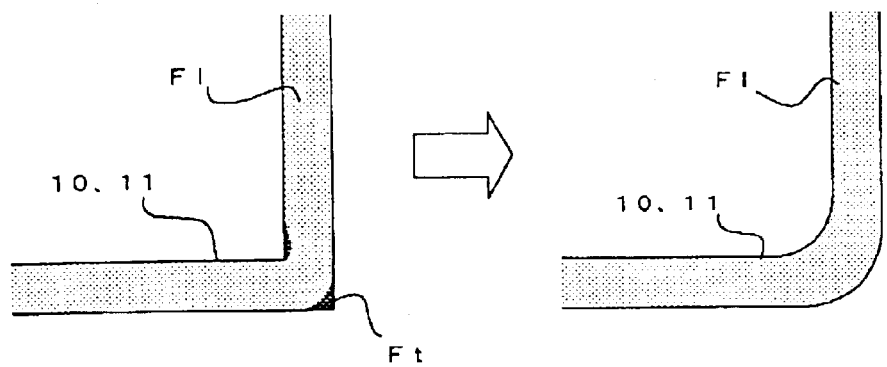
FIGS. 7A and 7B are explanatory views for explaining the air flow at a bent portion of a pipe forming an air flow passage.

As shown in FIG. 7A, the air flow is prone to become the turbulent flow Ft in the vicinity of a concave portion and a convex portion of the flow path at a bent portion of the main pipe 10 and the branch pipe 11. Thereupon, as shown in FIG. 7B, the bent portion is formed in a smooth curve as much as possible, thereby preventing local turbulent flow from generating.

Figure 8:
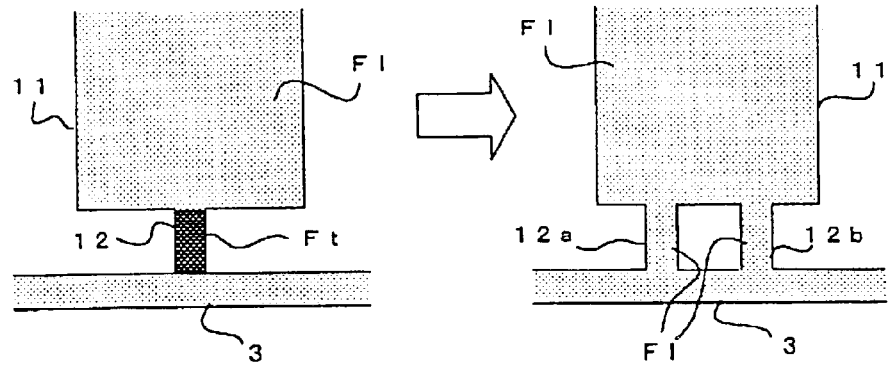
FIGS. 8A and 8B are diagrams for explaining a structure for preventing a turbulent flow from generating in an orifice.

The orifice 12 is a portion where the flow path becomes thinnest, and the flow velocity is increased, the Reynolds number Re is increased and the air flow is prone to become the turbulent flow Ft as shown in FIG. 8A. Thereupon, as shown in FIG. 8B, the number of orifices is increased to bring the air flow at this portion into a laminar flow. In the example shown in FIG. 8B, the tip end of the branch pipe 11 is provided with two orifice holes 12a and 12b to prevent the turbulent flow from generating.

In each of the above-described embodiments, size and shape of the air passage are determined, based on the supplied air pressure applied to the aerostatic bearing, such that the Reynolds number in each portion becomes 2000 or less, thereby preventing the turbulent flow from generating. That is, the air flow passage is designed in such a manner that size, the number and shape of each of the main pipe 10, branch pipe 11 and orifice 12 are determined such that the Reynolds number becomes 2000 or less.

The flow velocity of air flowing through the air flow passage of the main pipe 10, branch pipe 11 and orifice 12 can also be reduced by reducing the flow rate of air flowing out from the orifice 12, in addition to the design of the above-described pipes. Accordingly, the bearing clearance 3 is set to 6 μm or less in a case of the present invention, though a conventional bearing clearance is 10 to 20 μm. With this design, the flow rate of air flowing out from the orifice 12 is reduced, and the Reynolds number is reduced. If the bearing clearance 3 is reduced in size, there is an effect that rigidity of the bearing is enhanced.

Figure 9:
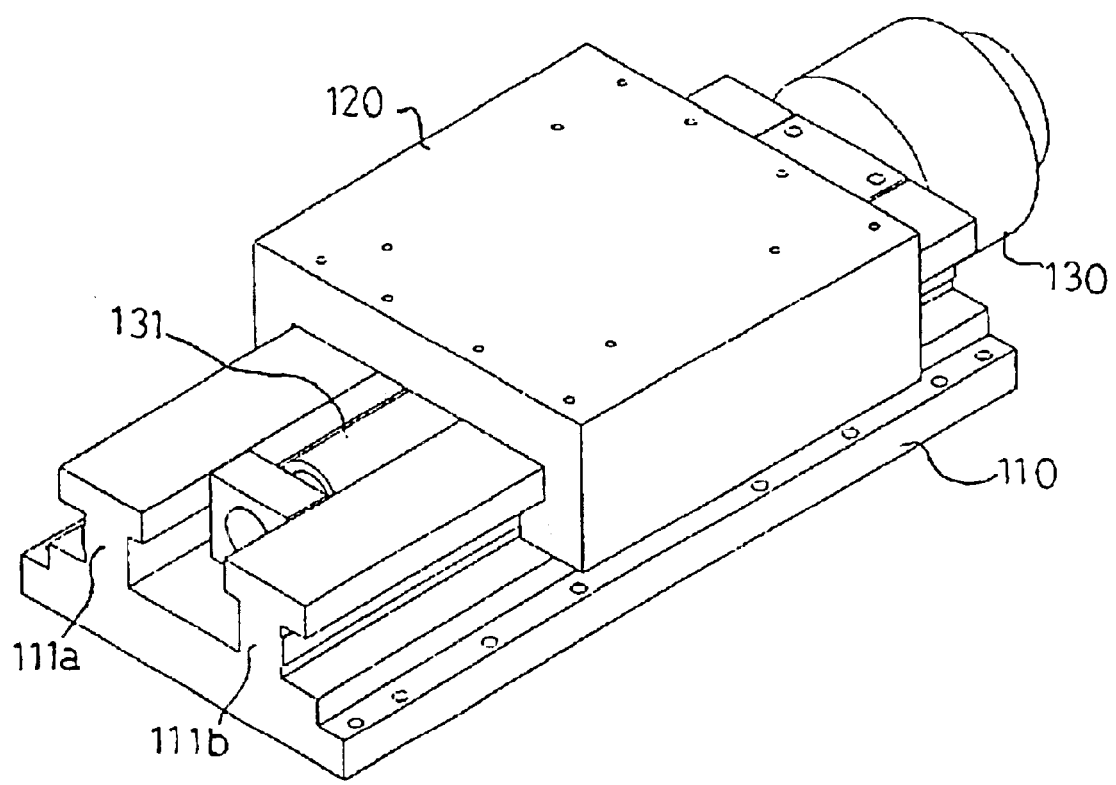
FIG. 9 is a perspective view of a linearly movable mechanism to which the aerostatic bearing of the present invention is applied.
Figure 10:
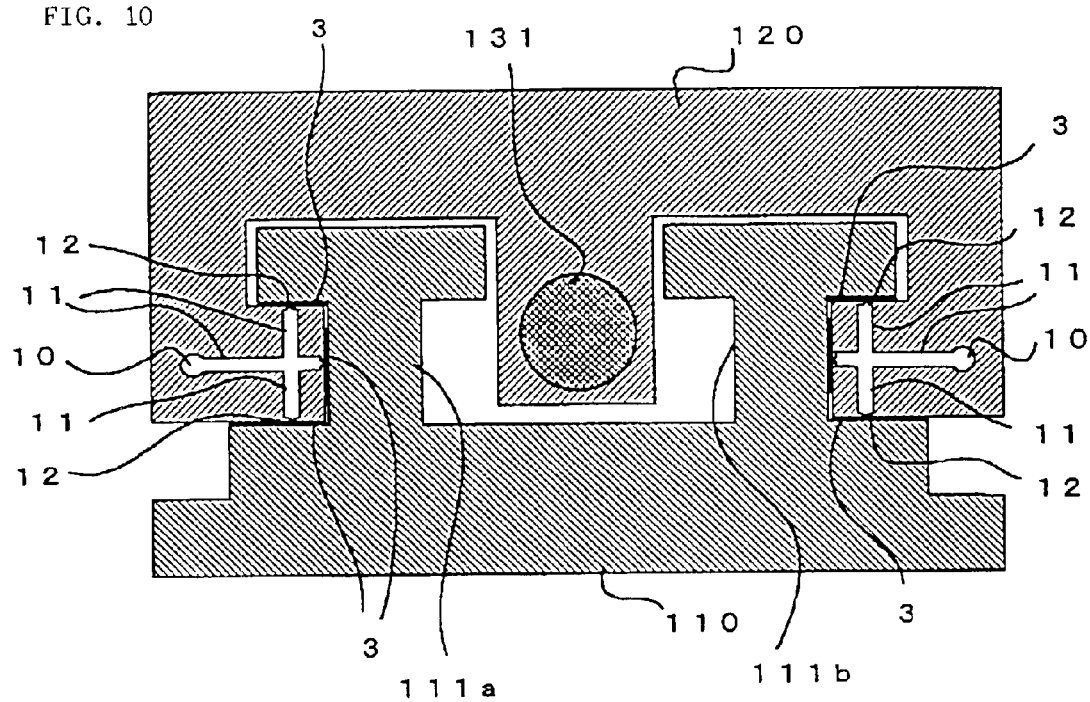
FIG. 10 is a sectional view of the linearly movable mechanism shown in FIG. 9.

FIG. 9 is a perspective view of one embodiment of a linearly moving mechanism to which the aerostatic bearing of the present invention is applied. The linearly moving mechanism is used for precisely positioning a machine tool or a measuring device. FIG. 10 is a sectional view of this embodiment.

A stationary portion 110 is provided with a pair of guide members 111a and 111b. A slide 120 of a movable member is guided by the guide members 111a and 111b and the slide 120 can move linearly. A motor 130 is mounted to the stationary portion 110, and a screw 131 is mounted to a rotor shaft of the motor 130. The slide 120 includes a nut which is threadedly engaged with the screw. The motor 130 is driven to convert rotating motion into linear motion by the screw 131 & nut mechanism, thereby linearly moving the slide 120 along the guide members 111a and 111b.

The slide 120 comprises the aerostatic bearing of the present invention as shown in FIG. 10. That is, legs of the slide 120 are opposed to bottom surfaces, side surfaces and top surfaces of the guide members 111a and 111b. These portions constitute the bearing clearances 3, air flows out into the bearing clearances from the orifices 12 through the main pipes 10 and the branch pipes 11 provided in the slide 120, thereby constituting the aerostatic bearing. Although it is not shown in the drawing, the screw is also constituted by the aerostatic bearing, and the slide 120 can be positioned in units of 1 nanometer in a complete non-contact manner.

Figure 11:
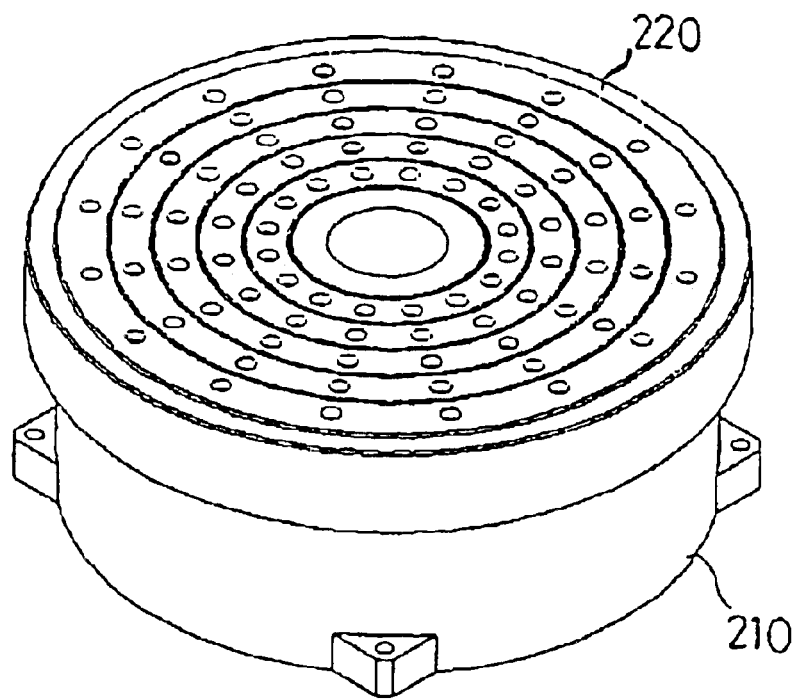
FIG. 11 is a perspective view of a turning table apparatus to which the aerostatic bearing of the present invention is applied.
Figure 12:
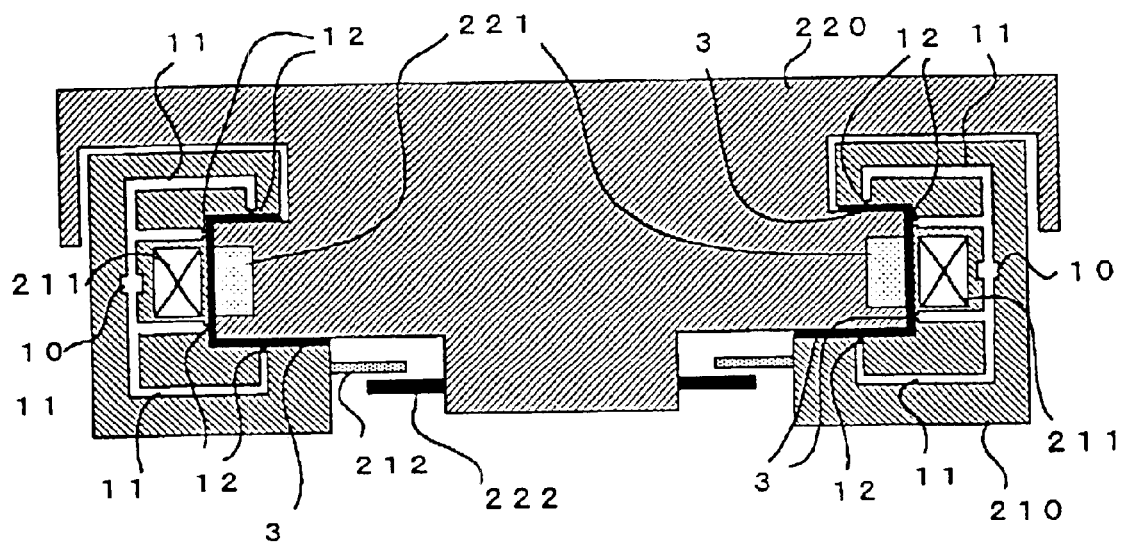
FIG. 12 is a sectional view of the turning table apparatus shown in FIG. 11.

FIG. 11 is a perspective view of one embodiment of a turning table apparatus to which the aerostatic bearing of the present invention is applied. FIG. 12 is a sectional view of this embodiment. This embodiment is also applied to a machine or an apparatus such as a machine tool or a measuring device which requires precise positioning.

In this embodiment, the turning table apparatus itself constitutes a motor, and a stationary portion 210 constitutes a stator of the motor (AC servomotor). A rotating rotor portion 220, which is a movable member, constitutes a rotor of the motor. An upper surface of the rotor portion 220 is formed with a groove or hole so that a work or various member to be worked can be mounted therein. A portion which is engaged with the stationary portion (stator) 210 is formed into a flange-like shape, and magnets 221 are disposed around a periphery of the flange-like portion.

The stationary portion 210 is formed with surfaces which are opposed to upper and lower surfaces and a side surface of the flange-like portion of the rotor portion 220, and the bearing clearances 3 are formed between the opposed surfaces. In the stationary portion 210, coils 211 are disposed at positions opposed to the magnets 221 of the rotor portion 220, pipes forming air passages of the main pipes 10 and the branch pipes 11 are disposed, and orifices 12 are disposed on tip ends of the branch pipes 11. Air flows out from the orifices 12 into the bearing clearances 3 formed between upper and lower peripheral surfaces and side peripheral surface of the flange-like portion of the rotor portion 220 and a surface of the stationary portion 210 opposed thereto.

The rotor portion 220 is provided with a code-disc 222, and the stationary portion 210 is provided with a light receiving element 212 such as to be opposed to the code-disc 222 so that the rotating position of the rotor portion 220 can be detected.

In this embodiment, it is possible to carry out rotational positioning with a precision of a hundred-thousandth of a degree because the rotor portion 220 is of a complete non-contact structure with respect to the stationary portion 210, and further, the aerostatic bearing is constituted by the main pipe 10, the branch pipe 11, the orifices 12 and the bearing clearance 3 provided in the stationary portion 210, as described above.

The rotor 130 of linearly moving mechanism shown in FIGS. 9 and 10 is also constituted in the same manner as the turning table apparatus shown in FIGS. 11 and 12, and the rotor of the motor 130 is supported by the stator by means of the aerostatic bearing with a non-contact structure.

Figure 13:
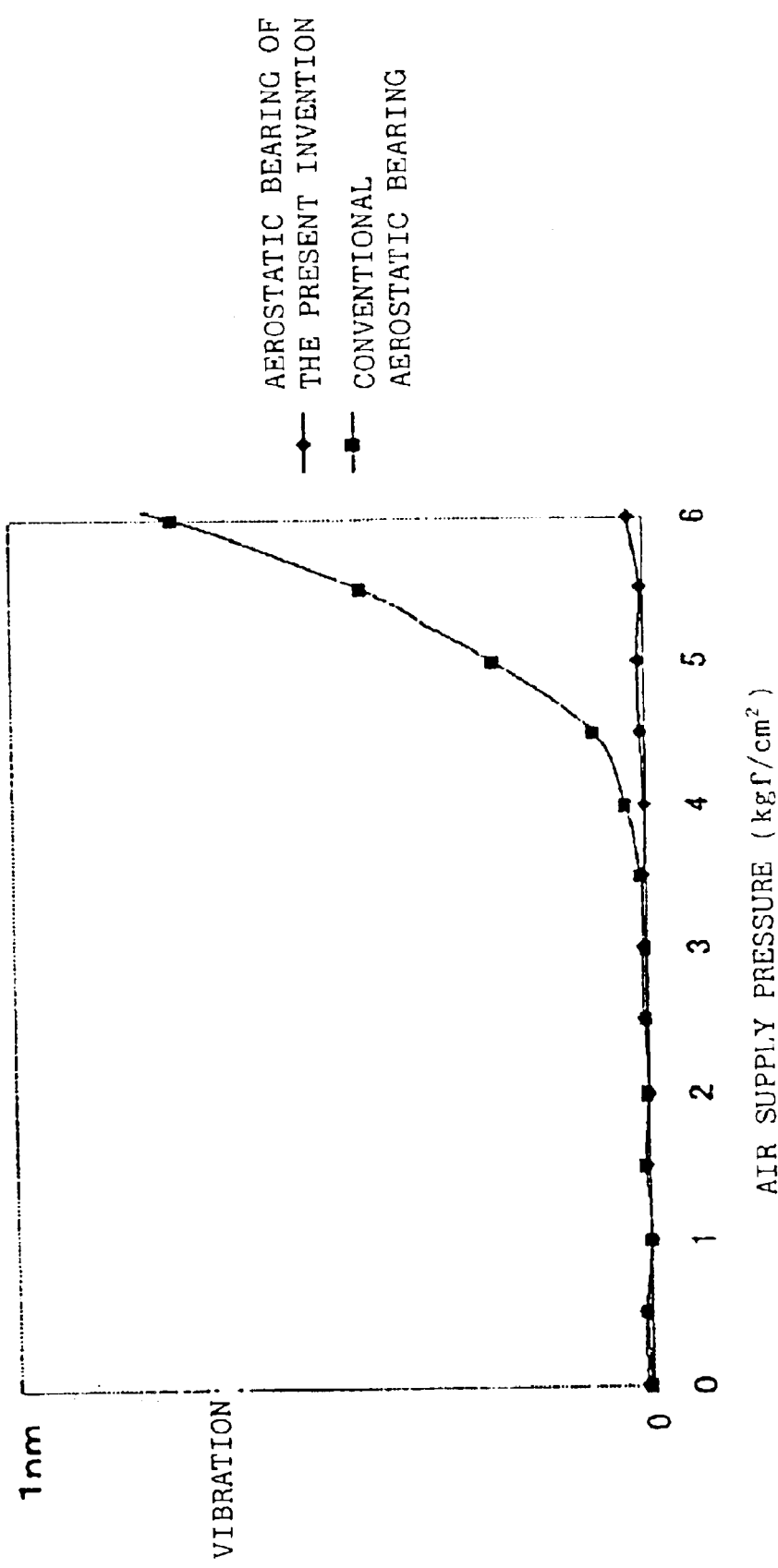
FIG. 13 is a graph showing a result of experiment concerning an aerostatic bearing of the present invention and a conventional aerostatic bearing.

An experiment was carried out using the aerostatic bearing of the present invention and a conventional aerostatic bearing in order to confirm the effect of an aerostatic bearing of the present invention. In the experiment, vibration was measured. FIG. 13 shows a result of the experiment. An air supply pressure was increased from 1 kgf/cm$^2$ to 6 kgf/cm$^2$, and vibrations of both the aerostatic bearings were measured. When the air supply pressure was up to 3 kgf/cm$^2$, both the aerostatic bearings were almost the same in vibration such that vibrations thereof were at such a level that they could not be measured, i.e., almost no vibrations were generated. When air supply pressure exceeded 3 kgf/cm$^2$, however, vibration of the conventional aerostatic bearing was gradually increased. In the aerostatic bearing of the present invention, however, even when the air supply pressure exceeded 3 kgf/cm$^2$, the vibration was still at such a level that the vibration could not be measured, and under the maximum air supply pressure of 6 kgf/cm$^2$, a remarkable difference in generation of vibration was generated between the aerostatic bearing of the present invention and the conventional aerostatic bearing.

As described above, according to the aerostatic bearing of the present invention, it is possible to stabilize the aerostatic bearing with a precision of 1 nanometer or less.

What is claimed is:

1. An aerostatic bearing in which a guide member and a movable member are disposed such as to be opposed to each other through a bearing clearance therebetween, one of the guide member and movable member is formed with an air-supply passage so that air flow is supplied to the bearing clearance, wherein said air-supply passage has a plurality of air flow inlets to thereby reduce a velocity of the air flow in a vicinity of the air flow inlets, and air which has passed through the air-supply passage is supplied through orifices to said bearing clearance, and the air-supply passage and the bearing clearance are constituted such that the air flow becomes laminar flow in the air-supply passage and bearing clearance based on the air supply pressure applied.

2. The aerostatic bearing according to claim 1, wherein the air-supply passage comprises a main pipe and a branch pipe connected to the main pipe.

3. The aerostatic bearing according to claim 2, wherein the aerostatic bearing includes a plurality of main pipes, and the main pipes are connected to each other through the branch pipe.

4. The aerostatic bearing according to claim 2 wherein a cross-sectional area of an air passage of the main pipe is greater than a cross-sectional area of an air passage of the branch pipe.

5. The aerostatic bearing according to claim 2, wherein bent portions of the main pipe and branch pipe are constituted in a smooth curve.

6. The aerostatic bearing according to claim 2, wherein the orifices comprise two or more holes.

7. The aerostatic bearing according to claim 1, wherein the bearing clearance is 6 μm or less.

8. The aerostatic bearing according to claim 1, wherein size and shape of each of the air-supply passage and bearing clearance are set such that Reynolds number of air flow in each portions of the air-supply passage and bearing clearance becomes 2000 or less.

9. A machine tool to which the aerostatic bearing according to claim 1 is applied.

10. A measuring device to which the aerostatic bearing according to claim 1 is applied.

11. An aerostatic bearing, comprising:

a guide member;

a movable member, the guide member and the movable member opposing each other through a bearing clearance; and an air supply passage, formed in one of the guide member and the movable member, so as to allow a laminar air flow to be supplied to the bearing clearance, wherein said air supply passage has a plurality of air flow inlets to thereby reduce a velocity of the air flow in a vicinity of the air flow inlets, and air which has passed through the air supply passage is supplied through orifices to said bearing clearance.

* * * * *